(12) United States Patent
Shook

(10) Patent No.: US 12,114,667 B2
(45) Date of Patent: Oct. 15, 2024

(54) DOUGH PRODUCT PACKAGING ASSEMBLY AND METHOD OF PACKAGING

(71) Applicant: General Mills, Inc., Minneapolis, MN (US)

(72) Inventor: Brandon Shook, Minneapolis, MN (US)

(73) Assignee: General Mills, Inc., Minneapolis, MN (US)

( * ) Notice: Subject to any disclaimer, the term of this patent is extended or adjusted under 35 U.S.C. 154(b) by 757 days.

(21) Appl. No.: 17/147,680

(22) Filed: Jan. 13, 2021

(65) Prior Publication Data

US 2022/0217983 A1 Jul. 14, 2022

(51) Int. Cl.
| | | |
|---|---|---|
| *A21D 10/00* | (2006.01) | |
| *A21D 10/02* | (2006.01) | |
| *B65D 3/00* | (2006.01) | |
| *B65D 3/04* | (2006.01) | |
| *B65D 8/00* | (2006.01) | |
| *B65D 77/00* | (2006.01) | |
| *B65D 77/04* | (2006.01) | |

(52) U.S. Cl.
CPC ............ *A21D 10/025* (2013.01); *B65D 3/04* (2013.01); *B65D 15/04* (2013.01); *B65D 77/0413* (2013.01)

(58) Field of Classification Search
CPC ...... A21D 10/025; B65D 35/10; B65D 35/14; B65D 35/22; B65D 3/04; B65D 15/04; B65D 77/0413; B65B 2220/16
See application file for complete search history.

(56) References Cited

U.S. PATENT DOCUMENTS

| | | |
|---|---|---|
| 3,015,429 A | 1/1962 | Morici |
| 3,039,601 A | 6/1962 | Martin |
| 3,243,038 A | 3/1966 | Caramanian |
| 3,385,503 A | 5/1968 | Stump |
| 3,662,913 A | 5/1972 | Mascia |
| 3,746,158 A | 7/1973 | Connick |
| 3,851,757 A | 12/1974 | Turpin |
| 4,114,784 A | 9/1978 | Hough et al. |
| 4,522,298 A | 6/1985 | Weinberger |
| 5,807,597 A | 9/1998 | Barnes et al. |
| 5,950,913 A | 9/1999 | Rea et al. |
| 6,109,470 A * | 8/2000 | Antal, Sr. .......... B65D 81/3216 220/240 |

(Continued)

*Primary Examiner* — Ericson M Lachica
(74) *Attorney, Agent, or Firm* — Jordan IP Law, LLC; John Crimmins, Esq.; Tina Yin Sowatzke, Esq.

(57) ABSTRACT

A dough product packaging assembly includes one or more dough pieces arranged a first container having a closed, internal cavity, a second container supported upon the first container with an open top portion, a third container housing one or more additional ingredients, such as icing, within the second container, and an outer container extending across the open top portion of the second container and encapsulating each of the first, second and third containers. In connection with production, transportation and consumer displaying of the product, the second container provides support and transfers weight from any cartons stacked above a lower dough product directly onto the first container, thereby allowing the outer or fourth container to act as a containment vessel only, versus something needed to directly provide vertical structural support.

20 Claims, 2 Drawing Sheets

(56) References Cited

U.S. PATENT DOCUMENTS

| | | |
|---|---|---|
| 9,828,138 B2 | 11/2017 | Buccellato |
| 2004/0071838 A1 | 4/2004 | Kirk |
| 2008/0286420 A1* | 11/2008 | Domingues ............ A21D 6/001 |
| | | 426/111 |
| 2019/0359408 A1* | 11/2019 | Kackman ................ B65D 77/30 |
| 2023/0122188 A1* | 4/2023 | Billiet ................... B65D 85/36 |
| | | 426/531 |

* cited by examiner

DOUGH PRODUCT PACKAGING ASSEMBLY AND METHOD OF PACKAGING

BACKGROUND OF THE INVENTION

The invention generally pertains to the art of food preparation and, more specifically, to a packaged dough product, as well as a method of packaging the dough product. In particular, the invention is concerned with establishing a combined, four container packaging assembly for storing both dough and at least one additional ingredient in separate regions.

Due to the time demands placed on consumers by the everyday activities of modern life, the preparation of food products and meals from scratch has decreased and the popularity of pre-made or partially pre-made foods has increased dramatically. A food product that has become increasingly popular in a pre-made configuration are dough based food products such as, for example, developed and undeveloped dough products. These dough products can be stored in either a refrigerated or frozen state for extended periods and are "freshly" prepared in a matter of minutes as desired by the consumer. In some instances, these dough products can represent a substantially final product requiring only a heating or baking step such as, for example, cookies, bread, bread sticks, biscuits and croissants. Alternatively, these dough precuts can represent components or building blocks of a final product such as, for example, a pie crust or pizza dough that will be combined with a variety of other ingredients to form the final product. Regardless of whether the dough product itself constitutes a final product or merely a component of the final product, these dough products constitute enormous time savers for the consumer in that the consumer need not prepare the dough products from scratch using base ingredients such as, for example, flour, water, eggs, yeast, salt, sugar and the like.

One popular method for packaging and storing dough products has been to use a can format, wherein the dough product is contained within a cylindrical, paperboard body having caps at both ends of the body. Depending upon the dough product, these cans can be constructed to withstand increased internal pressures. While the can format can work very well for dough products, there are some instances in which it is desirable to include additional ingredients for use with the dough product in order to complete or enhance enjoyment of the final cooked dough product. In order to accommodate these additional ingredients in a can format, a variety of designs have been utilized for separating the additional ingredients from the dough within a common can. Certain known configurations employ the use of a separate cup or pouch to store the additional ingredients, with the cup being placed in the can either prior to or after the dough. With either arrangement, given that the dough will proof within the can and thereby expand, resulting in an increase in the internal pressure of the can, care must be taken to assure that the cup, pouch and/or overall container can withstand the increased internal pressure. Typically, this pressure issue is addressed in two ways, i.e., designing the can to release the building pressure and constructing the cup or pouch to withstand the increased pressure. Unfortunately, regardless of efforts expended in this field, it is not uncommon for the cups or pouches of additional ingredients to burst within the can. Other known configurations employ two separate, individually enclosed containers, one for the dough and one for the additional ingredient(s), and then interconnecting the two containers. At the very least, this type of configuration is more costly and time consuming to mass produce, while also being more difficult for consumers to open and otherwise handle.

SUMMARY OF THE INVENTION

In accordance with the invention, a dough product packaging assembly includes first, second, third and fourth containers which combine to separately store one or more dough pieces and one or more additional ingredients. More specifically, the overall product has one or more dough pieces arranged a first container having a closed, internal cavity, a second container supported upon the first container with an open top portion, a third container housing one or more additional ingredients, such as icing, within the second container, and an outer container extending across the open top portion of the second container and encapsulating each of the first, second and third containers. In preferred forms of the invention, the first container is a spirally wound paperboard or other fibrous tube having closed ends, the second container is an open-ended tubular member, the third container is a pouch or cup, and the outer or fourth container is a paperboard or shrink wrap container.

During initial packaging, one end of the first container is closed and then the first container is loaded with the one or more dough pieces. The dough piece(s) can take various forms, such as a rolled dough sheet or individually stacked dough discs. After loading, the opposite end of the first container is sealed. Thereafter, the second container is supported atop the first container and loaded through the open top portion with the third container. Finally, the first, second and third containers are surrounded by the fourth container which closely envelopes each of the first and second containers so as to extend directly across the open top portion of the second container to maintain the third container within the second container.

Subsequent to the initial packaging, the dough piece(s) proofs and expands within the first container, thereby increasing the pressure within the first container but not subjecting the additional ingredients to this increase in pressure. At the same time, the second container acts as a structural support while creating a void of space or compartment that can be filled with the third container. In connection with mass production, product transportation and consumer displaying of the product, the overall arrangement particularly allows the use of vertical shelf space more efficiently and reduces the need to make a wider, shorter carton. The second container provides support and transfers weight from cartons stacked above a lower dough product during shipment directly onto the first container. This arrangement allows the outer container to act as a containment vessel only versus something needed to directly provide vertical structural support.

Additional objects, features and advantages of the invention will become more readily apparent from the following detailed description of the invention wherein like reference numerals refer to corresponding components in the several views.

DETAILED DESCRIPTION OF INVENTION

Figure 1:
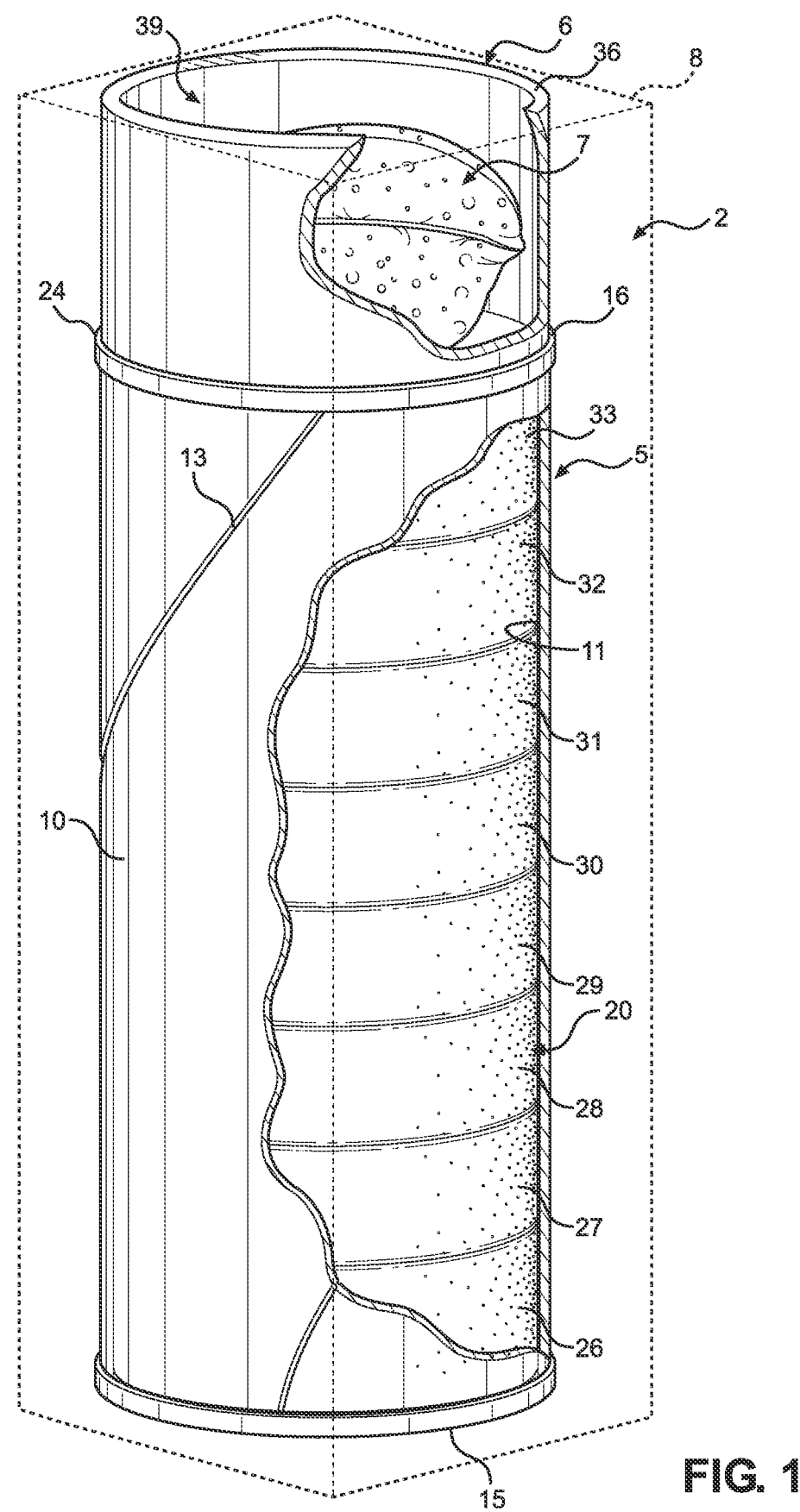
FIG. 1 is a partial cross-sectional view of a dough product constructed in accordance with the invention.
Figure 2:
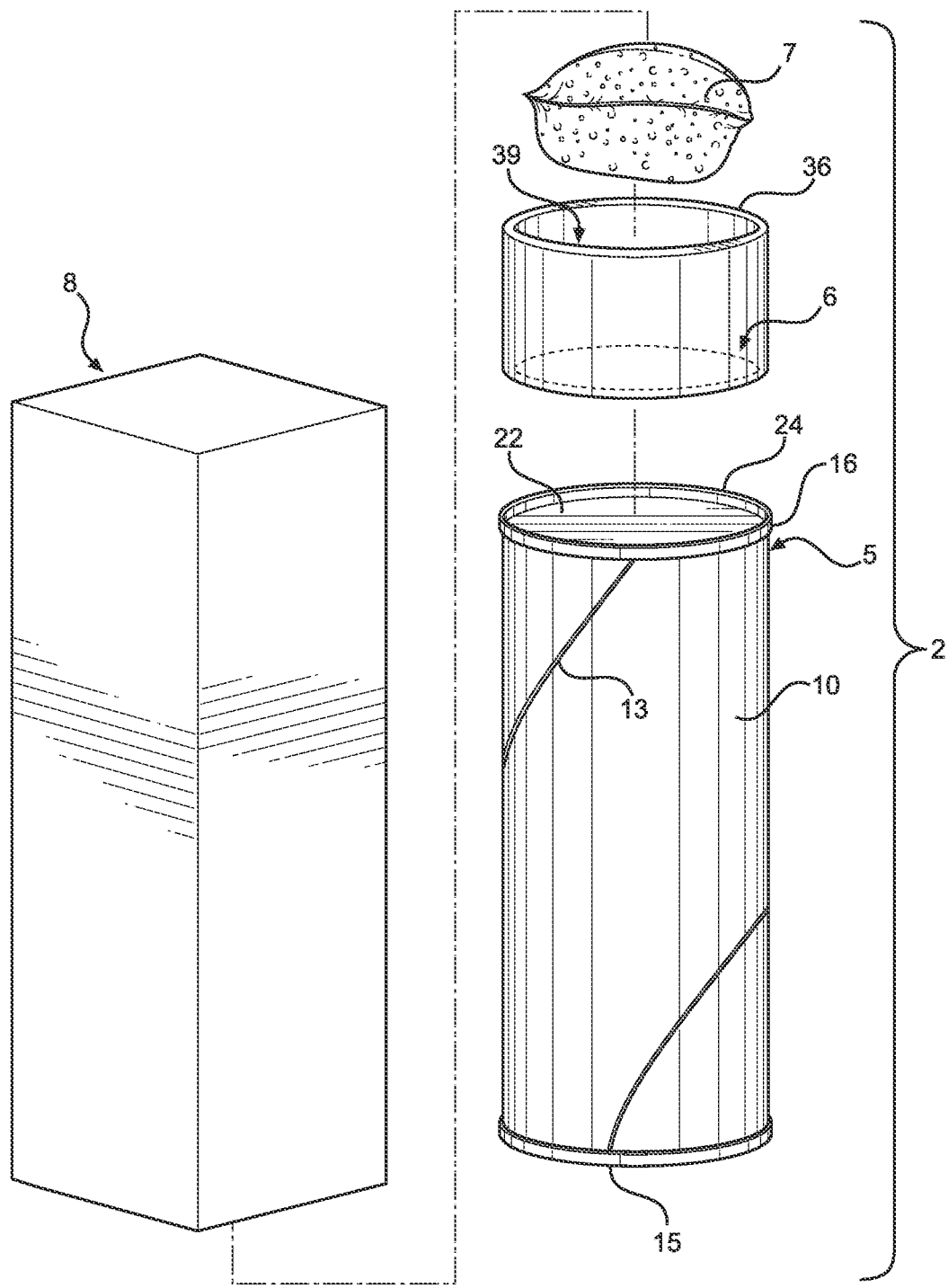
FIG. 2 is an exploded view of the dough product of the invention.

With reference to FIGS. 1 and 2, there is shown a canned dough product provided in a food product generally indicated at 2. As will be detailed more fully below, food product 2 includes first, second, third and fourth containers 5-8 respectively (note fourth container 8 is shown in dotted in FIG. 1 just to visually expose first, second and third containers 5-7). First container 5 takes the form of a tube 5 having an outer surface 10 and an inner surface 11. In the embodiment shown, tube 5 is made of paperboard and includes a spiral seam 13. Tube 5 is closed at both ends, such as with first and second end caps 15 and 16 which are crimped or otherwise secured to longitudinally spaced end portions of tube 5 to establish a closed, interior cavity 20. Cap 15 includes a base 22 (see FIG. 2) and a projecting portion which, in the preferred embodiment shown, is constituted by an upstanding peripheral rim portion 24 extending annularly about base 22. Cap 16 is correspondingly constructed.

Interior cavity 20 is configured to contain one or more dough products. In the embodiment depicted, interior cavity 20 is shown to house a plurality of stacked dough products 26-33 (see FIG. 1) in the form of dough discs used to make biscuits. However, at this point, it should be realized that the invention can be utilized in packaging various different types of dough products, including dough discs, one or more sheets of dough or even a block of dough, for making a wide range of final products, including cookies, bread, biscuits, rolls, croissants, pie crust, pizza dough and the like.

As shown, second container 6 extends above dough products 26-33. More specifically, second container 6 is sized to be snuggly received inside upstanding rim portion 24 and rests directly upon base 22 and against rim portion 24 of end cap 16. In accordance with a preferred form of the invention, second container 6 is tubular in construction with opposing open ends. However, at the very least, second container 6 includes an opening 36 (shown as an open top portion) leading to an interior compartment 39. In accordance with the invention, second container 6 is designed to fully receive and house third container 7 within compartment 39.

Third container 7 can take various forms, such as a sealed pouch (as shown in FIGS. 1 and 2), cup or can, and contains additional ingredients for use with the dough products 26-33 in order to complete or enhance enjoyment of the final cooked dough product. For instance, in the case of the illustrated embodiment wherein dough products 26-33 constitute discs used to make biscuits, third container 7 can be employed to contain icing which can be spread upon the cooked biscuits. In other embodiments, third container 7 can contain other ingredients, such as garlic, cheese, butter or the like. Although only one third container 7 is shown, one or more additional ingredient containers could be provided in upper compartment 39 to store the additional ingredient(s).

Finally, the first, second and third containers 5-7 are surrounded by the fourth container 8 to establish food product 2. Here, it is important that fourth container 8 closely envelopes each of the first and second containers 5 and 6, thereby extending directly across opening 36 of second container 6 to maintain the relative positioning between second container 6 and first container 5, as well as maintaining third container 7 within second container 6. With a top portion (not separately labeled) of fourth container 8 essentially extending directly atop second container 6, second container 6 acts as a structural support while creating the void of space which establishes compartment 39 for third container 7.

During initial packaging, one end of first container 10 is closed, such as with end cap 15, and then first container 10 is loaded with the one or more dough pieces 26-33. As indicated above, the dough piece(s) can take various forms, such as a rolled dough sheet or individually stacked dough discs. After loading, the opposite end of first container 10 is sealed, such as by crimping on end cap 16. Thereafter, second container 6 is supported atop base 22 and within the confines of upstanding rim 24 of first container 5 and loaded, through opening 36, with third container 7. Finally, first, second and third containers 5-7 are surrounded by fourth container 8 which closely envelopes first container 5 and second container 6, while extending directly across open top portion 36 of second container 6 to maintain third container 7 within compartment 39 in establishing food product 2. As discussed above, dough products 26-33 at least partially proof within container 5. That is, as is known in the art, the dough includes a leavening agent, such as yeast, which will cause dough products 26-33 to expand within container 6 and the pressure within container 6 to increase. Certainly, container 6 is made to withstand this pressure change and, in connection with the invention, this expansion and pressure change does not affect the other components of food product 2 so there is no concern with third container 7 bursting.

Although described with reference to preferred embodiments of the invention, it should be understood that various changes and/or modification can be made without departing from the invention. In connection with mass production, product transportation and consumer displaying of food product 2, the overall arrangement particularly allows the use of vertical shelf space more efficiently and reduces the need to make a wider, shorter carton. The second container 6 advantageously provides support and transfers weight from any cartons stacked above a lower dough product during shipment directly onto first container 5. This arrangement allows the outermost or fourth container 8 to act as a containment vessel only versus something needed to directly provide vertical structural support. Therefore, fourth container 8 can be made of a thin, light weight material, such as thin paperboard. On the other hand, other materials could be employed, such as a film which shrink or otherwise wraps together first, second and third containers 5-7. If a transparent material is used for fourth container 8, product information can be provided on outer surface 10 of first container 5 and also perhaps the exposed surface (not separately labeled) of second container 6. However, if an opaque material is used for fourth container 8, the outside of container 8 would provide product information. Of course, fourth container 8 could constitute a hybrid package, such as a paperboard carton with a transparent window portion, in which case multiple containers of the invention could present product information. In addition, it should be noted that the sizes and shapes of the various containers employed in connection with the invention are not limited to those depicted but rather other complementary container configurations could be employed, including a wide range of polygon designs.

The invention claimed is:
1. A food product assembly comprising:
   a first container having first and second spaced end portions and an interior cavity, with the first container being closed at each of the first and second end portions;
   at least one dough product within the interior cavity of the first container;
   a second container supported on the first end portion of the first container, said second container having an opening exposing an interior compartment of the second container;

a third container housed within the interior compartment of the second container;

at least one additional ingredient housed within the third container; and a fourth container enveloping each of the first and second containers, maintaining relative positioning of the first and second containers within the fourth container, and extending directly across the opening of second container to maintain the third container within the second container.

2. The food product assembly of claim 1, wherein the first container includes, at the first end portion, a projecting portion, said second container being received against the projecting portion.

3. The food product assembly of claim 2, wherein the second container is a tubular member which establishes a structural support for the food product assembly and the fourth container acts as a containment vessel.

4. The food product assembly of claim 2, wherein the first container includes an end cap at the first end portion, with the end cap including a base and an upstanding rim, said second container resting upon the base within the upstanding rim.

5. The food product assembly of claim 2, wherein the first container constitutes a tube made of paperboard and including a spiral seam, with the tube being closed at each of the first and second end portions by respective caps to seal the interior cavity.

6. The food product assembly of claim 5, wherein the at least one dough product comprises dough discs, one or more sheets of dough or a block of dough.

7. The food product assembly of claim 5, wherein the second container is tubular in construction with opposing open ends.

8. The food product assembly of claim 7, wherein the third container comprises a sealed pouch, cup or can.

9. The food product assembly of claim 8, wherein the at least one additional ingredient housed in the third container constitutes icing, garlic, cheese or butter.

10. The food product assembly of claim 8, wherein the fourth container is a paperboard carton or shrink wrap film.

11. The food product assembly of claim 1, wherein the at least one dough product is configured to make cookies, bread, biscuits, rolls, croissants, pie crust or pizza dough.

12. The food product assembly of claim 1, wherein both the second and third containers are entirely outside of the interior cavity of the first container.

13. A method of packaging a dough product comprising:
closing off a first end portion of a first container;
loading at least one dough product into an interior cavity of the first container;
closing off a second end portion of the first container such that the first container is closed at each of the first and second end portions;
supporting a second container on the second end portion of the first container, while exposing an internal compartment of the second container through an opening of the second container;
loading a third container housing an additional ingredient into the internal compartment of the second container; and
enveloping each of the first and second containers with a fourth container, with the fourth container maintaining relative positioning of the first and second containers within the fourth container and extending directly across the opening of the second container to maintain the third container within the second container.

14. The method of claim 13, wherein supporting the second container on the second end portion of the first container includes receiving the second container within a projecting portion at the second end portion of the first container.

15. The method of claim 14, wherein closing off the second end portion of the first container includes mounting an end cap at the second end portion, with the end cap including a base and an upstanding rim, and wherein supporting the second container on the second end portion includes resting the second container upon the base within the upstanding rim.

16. The method of claim 15, wherein the second container is tubular in construction with opposing open ends and wherein supporting the second container on the second end portion of the first container includes supporting one of the opposing open ends on the base.

17. The method of claim 13, wherein supporting the second container on the second end portion of the first container establishes the second container as a structural support, with the fourth container acting as a containment vessel.

18. The method of claim 13, wherein enveloping each of the first and second containers with the fourth container includes either placing the first, second and third containers in a paperboard carton or shrink wrapping a film about the first, second and third containers.

19. The method of claim 13, wherein loading the at least one dough product into the first container includes inserting dough discs, one or more sheets of dough or a block of dough into the interior cavity.

20. The method of claim 19, wherein loading the third container into the internal compartment of the second container includes placing a sealed pouch, cup or can of icing, garlic, cheese or butter into the internal compartment of the second container.

* * * * *